(12) United States Patent
Hester

(10) Patent No.: US 8,584,815 B2
(45) Date of Patent: Nov. 19, 2013

(54) DISC BRAKE ASSEMBLY

(75) Inventor: Larry B. Hester, Dayton, OH (US)

(73) Assignee: Walther Engineering And Manufacturing Company, Inc., Franklin, OH (US)

( * ) Notice: Subject to any disclaimer, the term of this patent is extended or adjusted under 35 U.S.C. 154(b) by 174 days.

(21) Appl. No.: 13/175,035

(22) Filed: Jul. 1, 2011

(65) Prior Publication Data

US 2011/0259683 A1 Oct. 27, 2011

Related U.S. Application Data

(63) Continuation of application No. 12/022,698, filed on Jan. 30, 2008, now Pat. No. 7,980,367.

(51) Int. Cl.
*F16D 65/10* (2006.01)

(52) U.S. Cl.
USPC ............... 188/218 XL; 188/18 A; 301/105.1

(58) Field of Classification Search
USPC .......... 188/218 XL, 17, 18 A, 1.11 R, 1.11 E, 188/73.1; 301/105.1; 310/168; 384/448; 324/173, 174; 73/494, 493, 488
See application file for complete search history.

(56) References Cited

U.S. PATENT DOCUMENTS

| | | | |
|---|---|---|---|
| 6,830,250 B2 * | 12/2004 | Cervantez et al. | 280/5.501 |
| 7,306,293 B2 * | 12/2007 | Redgrave | 303/20 |
| 7,980,367 B2 * | 7/2011 | Hester | 188/218 XL |
| 7,997,391 B2 * | 8/2011 | Burgoon et al. | 188/218 XL |
| 8,020,676 B2 * | 9/2011 | Bradley et al. | 188/218 XL |
| 2006/0091723 A1 * | 5/2006 | Pete et al. | 303/113.1 |
| 2009/0218183 A1 * | 9/2009 | Burgoon et al. | 188/218 XL |

* cited by examiner

*Primary Examiner* — Thomas J Williams
*Assistant Examiner* — Mariano Sy
(74) *Attorney, Agent, or Firm* — Thompson Hine L.L.P.

(57) ABSTRACT

A disc brake assembly having a rotor defining a rotational axis and including a barrel portion and a disc portion extending generally radially outward from said barrel portion, the barrel portion including a tone ring receiving portion with a generally cylindrical inner surface having a tone ring receiving surface and a groove with an axially outer wall, an axially inner wall and a radially outer bottom surface; a generally annular tone ring positioned concentrically within said cylindrical inner surface of said tone ring receiving portion and having a generally radially facing outer surface; a resilient biasing element received in the groove and having a generally annular shape including a plurality of substantially linear segments and corners, the resilient biasing element may be shaped such that it is flexed when seated within the groove so that the corners are urged against the radially facing outer surface, and the substantially linear segments are urged against the axially outer wall and the radially facing outer surface of the tone ring to prevent separation of the tone ring from the rotor during use. In one aspect, the biasing element is formed in the shape of a regular polygon, such as a dodecahedron.

17 Claims, 4 Drawing Sheets

DISC BRAKE ASSEMBLY

CROSS-REFERENCE TO RELATED APPLICATION

Pursuant to 35 U.S.C. §120, this application is a continuation of, and claims the benefit of, U.S. application Ser. No. 12/022,698 filed Jan. 30, 2008, now U.S. Pat. No. 7,980,367, the entire contents of which are incorporated herein by reference.

BACKGROUND

The present application relates to disc brake assemblies, and more particularly, disc brake assemblies having tone rings connected thereto or otherwise associated therewith and methods for forming disc brake assemblies with tone rings.

Modern vehicles may employ an anti-lock braking system ("ABS system") to increase the traction and control of the vehicle during adverse driving conditions. ABS systems prevent the wheels from locking by rapidly releasing and reapplying brake pressure. A typical ABS system includes sensors for monitoring the rotational speed and/or acceleration of each wheel of the vehicle relative to the other wheels of the vehicle. The ABS system may be actuated when the rotational speed or acceleration of one or more wheels is different than the rotational speed or acceleration of the other wheels.

The sensors may measure the rotational speed of a wheel by monitoring the rotation of the associated brake rotor. A brake rotor may be provided with an associated tone ring having a plurality of evenly spaced exciter teeth thereon in order to facilitate the measurement of rotational wheel speed. A sensor may be positioned adjacent to the tone ring to detect the change in magnetic flux caused by movement of the exciter teeth past the sensor.

Prior art attempts to provide brake rotors with such tone rings have presented numerous problems and disadvantages. For example, casting brake rotors with exciter teeth presents integrity issues resulting from the difficulty of obtaining close tolerances using a foundry casting process, as well as corrosion breakdown of the exciter teeth. Furthermore, cast-in teeth require the application of a costly rust-preventative coating.

To avoid the problems associated with casting exciter teeth into the brake rotors, tone rings may be formed separately from the brake rotors, then bolted onto the rotors. However, this requires the additional machining step of tapping holes in the brake rotor, forming the tone ring with fastening ears, and requires the additional component of a fastener for securing the tone ring to the brake rotor, thereby increasing costs and presenting reliability issues.

Simply press-fitting tone rings to the brake rotors also creates risk of failure. If different materials having different coefficients of thermal expansion are used for the tone ring and the brake rotor, the different rates of expansion of the two components when heated during operation may cause separation of the tone ring from the brake rotor.

Accordingly, there is a need for a new and improved disc brake assembly having a tone ring connected thereto.

SUMMARY

In one aspect, the disclosed disc brake assembly may include a rotor defining a rotational axis and including a barrel portion and a disc portion extending generally radially outward from the barrel portion, wherein the barrel portion defines an inner surface and the inner surface defines a groove, a biasing element received in the groove, and a tone ring having an outer surface and including a step formed on the outer surface, the tone ring being positioned in the barrel portion such that the step is aligned for engagement with the biasing element. The groove may be defined by a bottom surface, an axially outer surface and an axially inner surface adjacent the barrel portion.

In another aspect, the disclosed disc brake assembly may include a rotor defining a rotational axis and including a barrel portion and a disc portion, the disc portion including at least one friction surface and extending generally radially outward from the barrel portion, wherein the barrel portion defines a generally circumferential inner surface and the generally circumferential inner surface defines a groove, a split retaining ring received in the groove, and a tone ring defining a generally circumferential outer surface and including a tapered step extending generally radially outward from the generally circumferential outer surface, the tone ring being positioned in the barrel portion such that the tapered step is aligned for engagement with the retaining ring.

In another aspect, the disclosed method for forming a disc brake assembly may include the steps of providing a biasing element, a rotor and a tone ring, the rotor including a barrel portion and a disc portion extending generally radially outward from the barrel portion, the barrel portion defining an inner surface and the inner surface defining a groove, the tone ring defining an outer surface and including a step formed on the outer surface, positioning the biasing element in the groove, and positioning the tone ring into the barrel portion such that at least a portion of the outer surface of the tone ring is aligned with at least a portion of the inner surface of the barrel portion and the step is aligned for engagement with the biasing element.

In an aspect, the barrel portion may include a stop, and the biasing element may be a regular polygon made up of substantially linear segments intersecting at corners. When inserted in the groove, the substantially linear segments may contact the tapered step of the tone ring and the axially outer wall of the groove, and the corners may contact the bottom surface of the groove. The biasing element may be sized to flex when placed into the groove, so that the corners urge against the groove bottom surface and force the linear segments against the groove outer wall and tapered step, which may force the tone ring axially to seat against the stop.

Other aspects of the disclosed disc brake assembly and method for forming a disc brake assembly will become apparent from the following description, the accompanying drawings and the appended claims.

DETAILED DESCRIPTION

Figure 1:
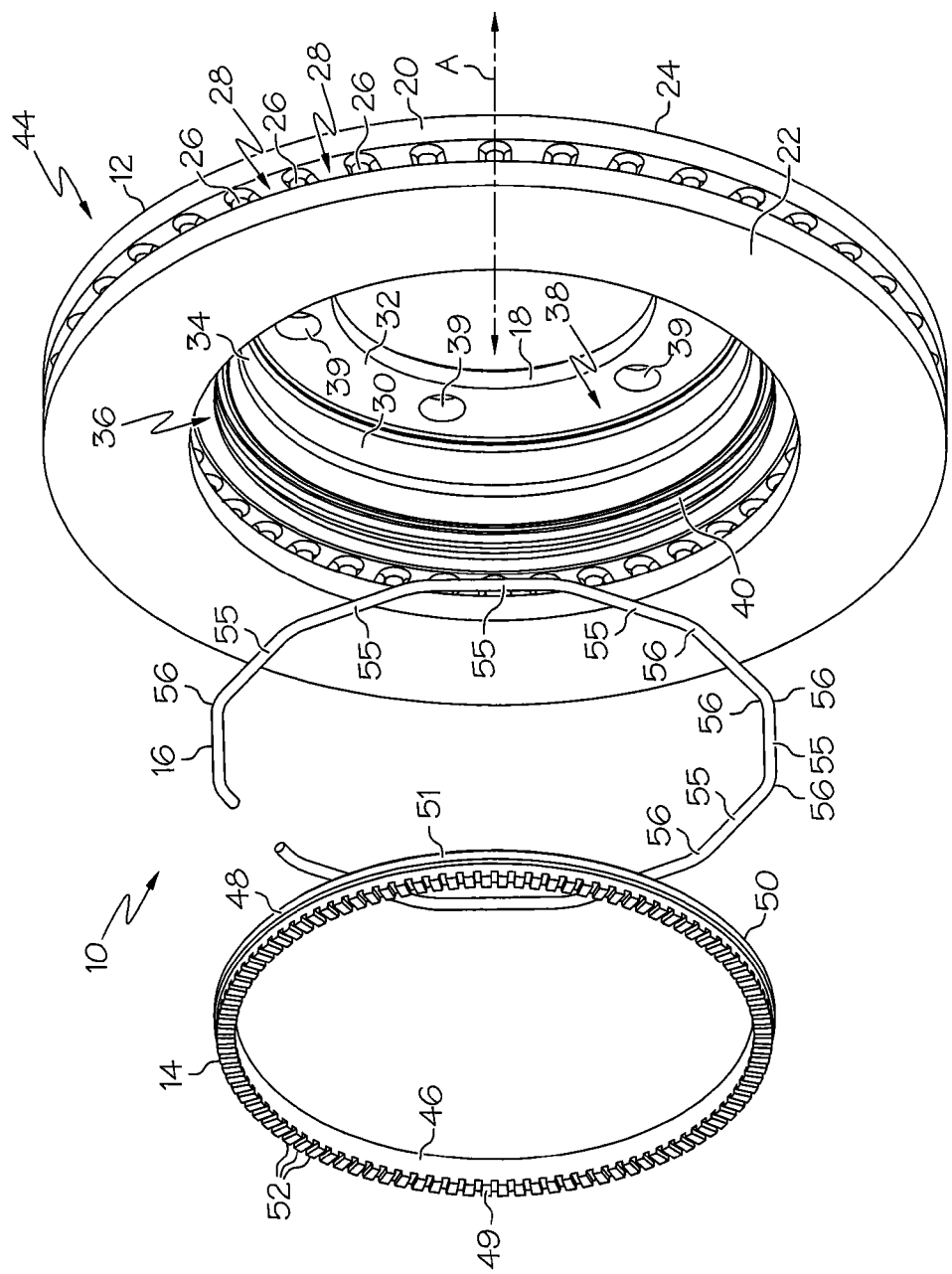
FIG. 1 is an exploded, perspective view of one aspect of the disclosed disc brake assembly.
Figure 2:
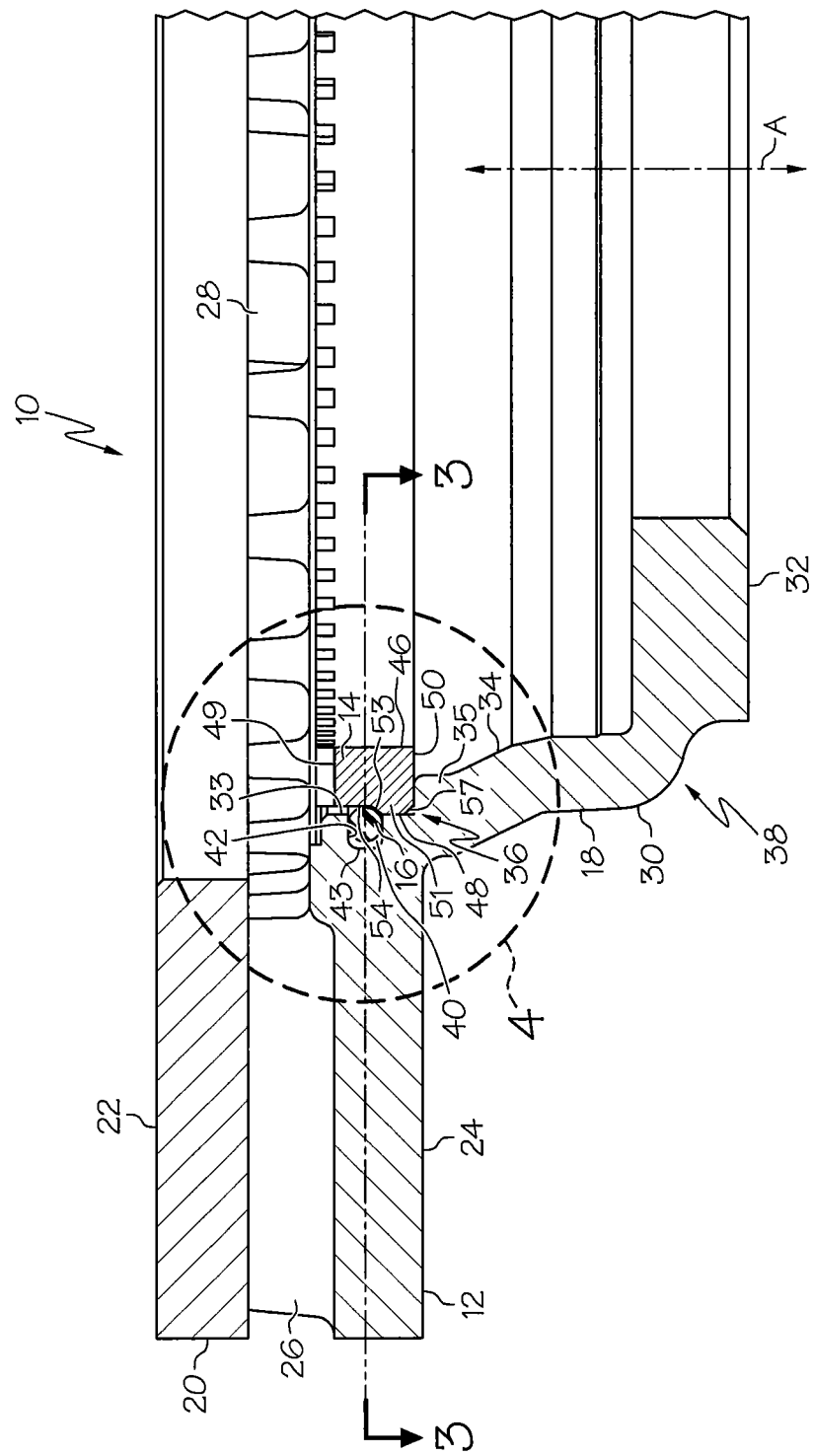
FIG. 2 is a partial elevational view of the disc brake assembly of FIG. 1, shown in section.

Referring to FIGS. 1 and 2, one exemplary aspect of the disclosed disc brake assembly, generally designated 10, may include a brake rotor 12, a tone ring 14 and a biasing element 16. The disc brake assembly 10 may be mounted to a wheel hub (not shown) of a vehicle (not shown), such as a passenger car or a truck. One or more brake pads (not shown) or other braking mechanism may be moveable into engagement with the disc brake assembly 10 to apply a braking force thereto.

The brake rotor 12 may include a barrel portion 18 and a disc portion 20 and may define a rotational axis A. The disc portion 20 may extend generally radially from the barrel portion 18 and may include at least a first friction surface 22 and a second friction surface 24. The first and second friction surfaces 22, 24 may be separated by a plurality of spaced cooling ribs 26 that define cooling channels 28 (FIG. 1) therebetween. The cooling ribs 26 may extend generally radially outward and may facilitate airflow through the cooling channels 28 between the first and second friction surfaces 22, 24 to cool the friction surfaces during a brake apply. At this point, those skilled in the art will appreciate that multi-disc brake rotors may be used without departing from the scope of the present disclosure.

The barrel portion 18 may include a side wall 30 and a mounting ring 32. The side wall 30 may be generally aligned with the rotational axis A and may include an inner surface 34. The side wall 30 may define a tone ring receiving portion 33 and, optionally, a stop 35. The inner surface 34 of the side wall 30 at the tone ring receiving portion 33 may be machined to closely receive the tone ring 14 therein, as discussed in greater detail herein. In one aspect, the side wall 30 of the barrel portion 18 may be generally cylindrical or annular in shape such that the inner surface 34 is generally cylindrical.

A first end portion 36 of the side wall 30 may be connected to the disc portion 20 and a second end portion 38 of the side wall 30 may be connected to and/or may define the mounting ring 32 of the barrel portion 18. The mounting ring 32 of the barrel portion 18 may include a plurality of spaced apertures 39 (see FIG. 1) sized and shaped to receive mounting bolts (not shown) therethrough such that the disc brake assembly 10 may be mounted on a wheel hub or the like.

Figure 4:
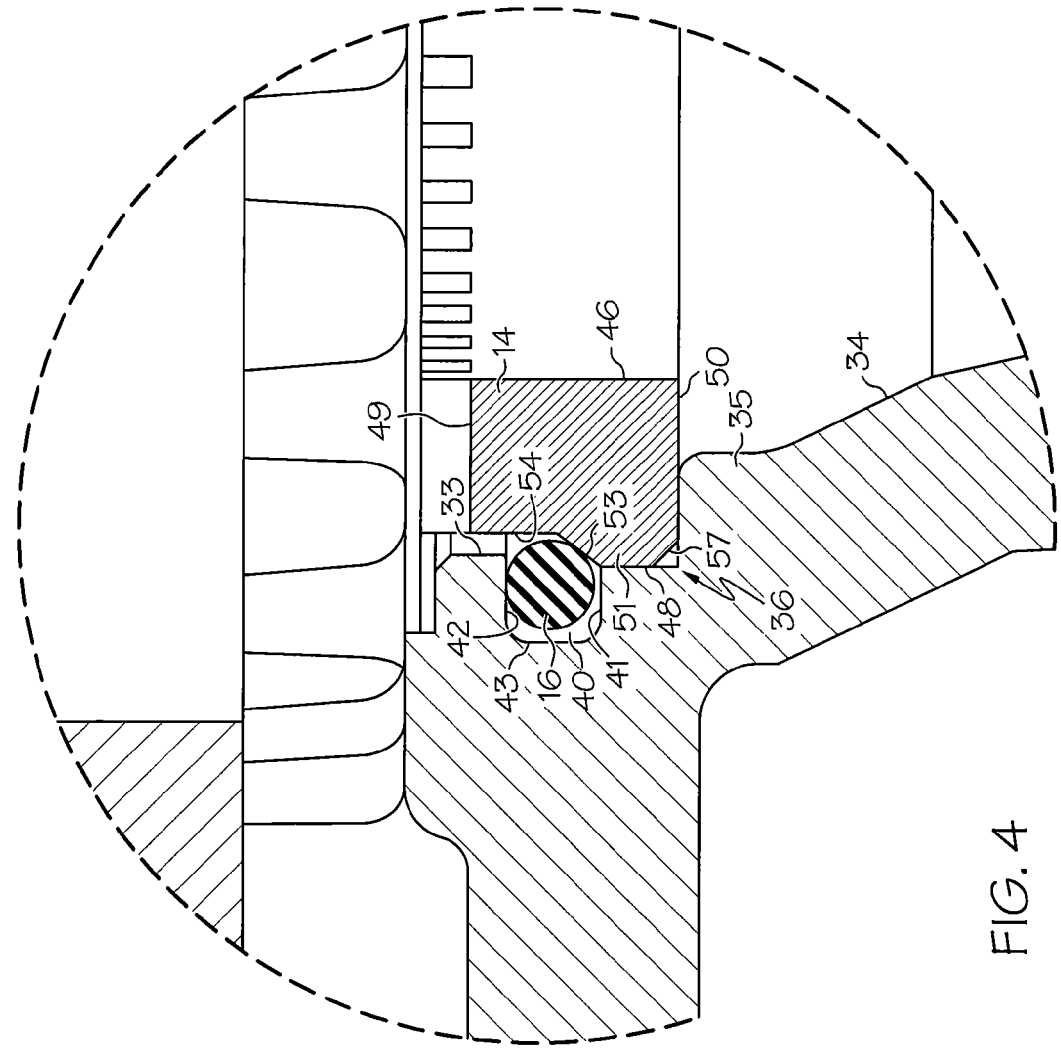
FIG. 4 is a detail taken from FIG. 2.

As shown in FIGS. 1, 2 and 4, a groove 40 may be formed in the inner surface 34 of the tone ring receiving portion 33 of the side wall 30 of the barrel portion 18. The groove 40 may extend generally radially outward from the inner surface 34 of the side wall 30. The groove 40 may be defined by an axially inner wall 41, an axially outer wall 42 and a radially outer bottom surface 43. The groove 40 may be sized and shaped to receive the biasing element 16 therein. In one exemplary and non-limiting aspect, the tone ring receiving portion 33 of the side wall 30 may be formed in the first end portion 36 of the side wall 30 such that the groove 40 is generally aligned with the disc portion 20 of the brake rotor 12.

The groove 40 may extend about the entire inner surface 34 of the tone ring receiving portion 33 of the side wall 30. However, the groove 40 may extend about only a portion or portions of the inner surface 34 of the tone ring receiving portion 33 of the side wall 30. If the barrel portion 18 is generally cylindrical or annular in shape, the groove 40 may be a circumferential groove and may extend about all or a portion of the circumference of the inner surface 34 of the tone ring receiving portion 33 of the side wall 30. Multiple grooves may be used in place of or in combination with the single groove 40 shown in FIGS. 1, 2 and 4, thereby requiring multiple biasing elements rather than the single biasing element 16 shown in FIGS. 1 and 2.

The barrel portion 18 and the disc portion 20 of the brake rotor 12 may be formed as a single unitary or monolithic body 44 (FIG. 1) by, for example, a casting process. Alternatively, the barrel portion 18 and the disc portion 20 may be formed as separate pieces and may be connected together by, for example, a welding process, to form the brake rotor 12. Any brake rotor or like device defining a groove 40 in an inner surface thereof may be used without departing from the scope of the present disclosure.

The tone ring 14 may be formed as a ring or annulus and may include a radially inner surface 46, a radially outer ring surface 48, an axial front face 49, an axial rear face 50, a step 51 and a plurality of exciter teeth 52 (see FIG. 1). The step 51 may include an axial step front face 53 (i.e., the portion of the step 51 that contacts the biasing element 16, as shown in FIGS. 2 and 4), which may be tapered or inclined relative to axis A. The axial step front face 53 transitions the tone ring 14 outer diameter from step 51, with a relatively greater diameter outer ring surface 48, to an annular surface 54, which is of a relatively lesser diameter than the outer ring surface and may not contact biasing element 16. The step 51 may include an annular chamfer 57 formed at the intersection of the radially outer surface 48 and the axial rear face 50. The axial lengths of the annular contact surface 54, axial step front face 53 and step 51 may be varied from the relative lengths shown in the figures.

For example, as shown in FIGS. 1, 2 and 4, the step 51 may be positioned generally adjacent to the rear face 50 of the tone ring 14 (i.e., at the axially rear portion of the tone ring 14). The exciter teeth 52 may be disposed on the front face 49 of the tone ring 14. The exciter teeth 52 may be spaced generally equally about the front face 49 of the tone ring 14 and may be sized and shaped to interact with an associated speed sensor (not shown).

In one aspect, the tone ring 14 may be formed from a material that is different from the material of which the brake rotor 12 is formed. For example, the tone ring 14 may be formed from steel or any appropriate ferro-magnetic material, while the brake rotor 12 may be formed from various materials such as aluminum, iron-based materials and the like. Any tone ring 14 having a step 51 extending generally radially outward from the outer surface 48 of the tone ring 14 may be used without departing from the scope of the present disclosure.

The biasing element 16 may be any device that may be received in the groove 40 in the brake rotor 12 to apply a biasing force to the tone ring 14 and/or to engage the step 51 of the tone ring 14 when the tone ring 14 is positioned in the brake rotor 12. In one aspect, the biasing element 16 may be a split retaining ring. In one example, the biasing element 16 may be a split retaining ring that is generally round or hoop-shaped and has a generally round or circular cross-section. In another example, the biasing element 16 may be a generally flat split retaining ring having curved corners at the inner diameter thereof. In another aspect, the biasing element may be a clip or a spring.

Figure 3:
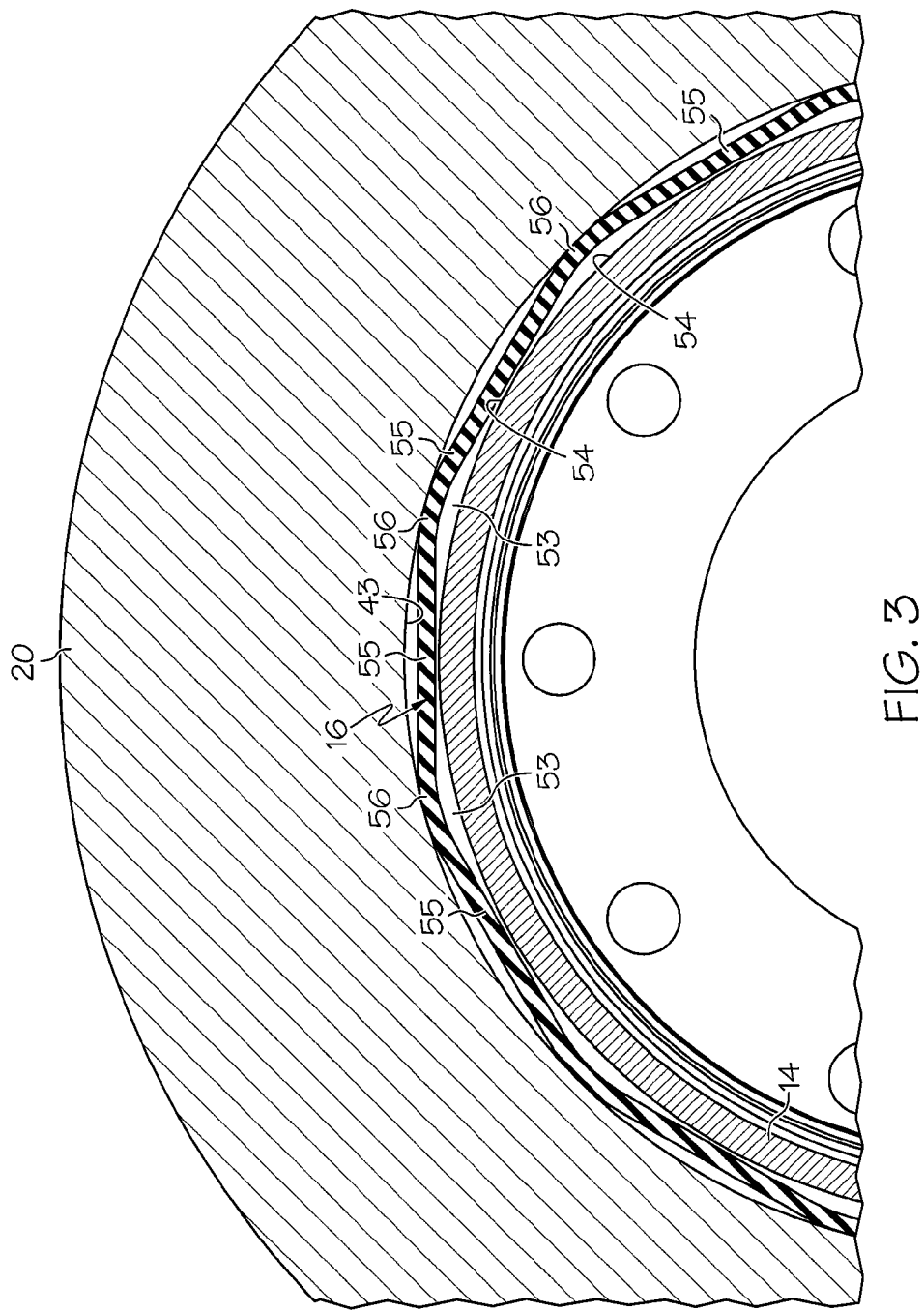
FIG. 3 is a partial sectional view taken at line 3-3 of FIG. 2.

In one aspect, as shown in FIGS. 1 and 3, the biasing element 16 may be formed by bending or other means to have a plurality of substantially linear segments 55 meeting at corners 56. In the aspect shown, the biasing element 16 may be substantially a regular polygon, such as a dodecagon (12-sided) in shape. Although element 16 as shown is referred to as a dodecagon, all or a portion of one of the linear segments 55 may be removed to allow the element to be bent to fit within the groove 40.

It is within the scope of the disclosure to form the biasing element 16 into other regular geometric shapes of greater or fewer sides than shown in the drawings, or into irregular geometric shapes of greater or fewer sides. It is also within the scope of the disclosure to provide a biasing element 16 that is generally ring or hoop shaped such that the linear segments 55 and corners 56 do not extend about the entire circumference of the element, but rather are grouped in a single location, or are spaced about the circumference in pairs (i.e., two linear segments joined by a corner making a pair) interconnected by substantially arcuate segments.

Referring to FIGS. 2, 3 and 4, the disc brake assembly 10 may be assembled by positioning the biasing element 16 into the groove 42, then positioning the tone ring 14 into the barrel portion 18 of the brake rotor 12 such that the tone ring is oriented to be substantially co-axial with the brake rotor. The outer surface 48 of the tone ring 14 is then aligned with the inner surface 34 of the tone ring receiving portion 33 of the barrel portion 18. Therefore, as the tone ring 14 is displaced axially into the barrel portion 18, the step 51 of the tone ring may overcome the biasing force of the biasing element 16 in response to the force being applied to the tone ring during the insertion step.

For example, when the biasing element 16 is a split retaining ring, the split retaining ring may expand radially outward to receive the tone ring 14. The chamfer 57 may engage and deflect the biasing element 16 radially outward such that the step 51 may be properly positioned, as shown in FIGS. 2, 3 and 4. As shown best in FIG. 3, the biasing element 16 may engage the tone ring 14 such that the corners 56 contact and urge against the radially outer bottom surface 43 of the groove 40, and the midportions of the linear segments 55 contact and urge against the axial step front face 53 of the tone ring 14 and the axially outer wall 42 of the groove.

In one aspect, the biasing element 16 is shaped such that, in order to fit within the groove 40 between the radially outer bottom surface 43 on the outside, and the axially outer wall 42 and axial step front face 53 on the inside, the segments 55 must be deflected from the angular relationship shown in FIG. 1, in which the biasing element 16 is not under stress, to the angular relationship shown in FIG. 3. As shown in FIG. 3, the biasing element 16 may be deflected such that the angles of the corners 56 (i.e., the interior angles of the polygonal shape of the biasing element 16) are slightly increased.

Alternately, the biasing element 16 may deflect such that the interior angles of the corners 56 do not deflect at all, or only slightly, and the linear segments 55 bow slightly, as shown in FIG. 3. It is within the scope of the invention to provide a biasing element 16 that, when mounted as shown in FIGS. 2 and 3, deflects such that both the corners 56 deflect and the linear segments bow. It is also within the scope of the invention to provide a biasing element 16 in which the linear segments 55 are slightly bowed when the biasing element is in the unstressed state.

Regardless of which of the aforementioned configurations of the biasing element 16 is employed, when assembled as shown in FIGS. 2, 3 and 4, because the biasing element 16 is flexed, the spring force of the biasing element may urge the corners 56 against the contact surface 43 and may urge the linear elements 55 against the axial step front face 53 and axially outer wall 42. The element 16 may be sized to provide clearance or separation from the axially inner wall 41. This spring force exerted by the biasing element 16 may wedge the linear segment 55 between the axially outer wall 55 and axial step front face 53, which forces the tone ring 14 in the direction of axis A against seat 18 in a generally radial direction acts to secure the biasing element in place during use, and increases the force applied to the angled axial step front face 53, which urges the rear face 50 of the tone ring 14 in the direction of axis A to seat against the stop 35 (see FIGS. 2 and 4).

In one aspect, the outer surface 48 of the tone ring 14 (or the step 51 that extends from the outer surface 48 of the tone ring 14) and the inner surface 34 of the tone ring receiving portion 33 of the barrel portion 18 may be sized to create an interference fit or a tight slip fit therebetween when the disc brake assembly 10 is in the assembled configuration. For example, the outer diameter of the tone ring 14 may be slightly larger than the inner diameter of the tone ring receiving portion 33 of the barrel portion 18, thereby facilitating an interference fit (or a tight slip fit) therebetween. The interference fit or the tight slip fit may provide an additional means for resisting disengagement of the tone ring 14 from the brake rotor 12.

The tone ring 14 may be axially aligned relative to the brake rotor 12 such that the groove 40 in the tone ring receiving portion 33 is positioned between the step 53 and the axial front face 49 of the tone ring 14, thereby allowing the biasing element 16 to engage the step 53 and resist disengagement of the tone ring 14 from the brake rotor 12. Therefore, if there is a loss of the interference fit (or the tight slip fit) discussed above, the biasing force of the biasing element 16 engaging the step 53 of the tone ring 14, and against the radially outer bottom surface 43 of the groove 40, will retain the tone ring 14 within the barrel portion 18 of the brake rotor 12.

Accordingly, the disclosed disc brake assembly 10 may provide a redundant and relatively low cost means for securing a tone ring 14 to a brake rotor 12.

Although various aspects of the disclosed disc brake assembly and method for forming a disc brake assembly have been shown and described, modifications may occur to those skilled in the art upon reading the specification. The present application includes such modifications and is limited only by the scope of the claims.

What is claimed is:

1. A disc brake assembly comprising:
   a rotor defining a rotational axis and including a barrel portion and a disc portion extending generally radially outward from said barrel portion, said barrel portion including a tone ring receiving portion with a generally cylindrical inner surface, said cylindrical inner surface having a groove defined by an axially outer wall, an axially inner wall and a radially outer bottom surface;
   a generally annular tone ring positioned concentrically within said cylindrical inner surface of said tone ring receiving portion and having a generally radially facing outer surface;
   a resilient biasing element received in said groove and having a generally annular shape including a plurality of substantially linear segments and corners, said resilient biasing element being shaped such that said resilient biasing element is flexed when seated within said groove so that said substantially linear segments are urged against said radially facing outer surface of said tone ring, and said corners are urged against said radially outer bottom surface of said groove to prevent separation of said tone ring from said rotor during use.

2. The assembly of claim 1, wherein said radially facing outer surface of said tone ring includes a step having a front face inclined relative to said rotational axis, said tone ring being positioned in said barrel portion such that said substantially linear segments of said biasing element contact said inclined front face and thereby apply a biasing force against said inclined front face to urge said tone ring against said tone ring receiving portion and capture said tone ring within said barrel portion.

3. The assembly of claim 2, wherein said biasing element is shaped to urge said substantially linear segments thereof to wedge between said axially outer wall and said inclined front face to urge said tone ring against said tone ring receiving portion.

4. The assembly of claim 3, wherein said biasing element is shaped to provide clearance with said axially inner wall when seated within said groove.

5. The assembly of claim 1, wherein said biasing element generally is in the shape of a polygon.

6. The assembly of claim 5, wherein said biasing element generally is in the shape of a regular polygon.

7. The assembly of claim 6, wherein said biasing element generally is in the shape of a dodecahedron.

8. The assembly of claim 1, wherein said biasing element is a split ring.

9. The assembly of claim 1, wherein said biasing element is generally ring shaped.

10. The assembly of claim 9, wherein said linear segments extend substantially about an entire circumference of said biasing element.

11. The assembly of claim 1, wherein adjacent ones of each of said plurality of linear segments meet to form said corners.

12. The assembly of claim 1, wherein said linear segments are slightly bowed when said disc brake assembly is assembled.

13. The assembly of claim 12, wherein said linear segments contact said radially facing outer surface of said tone ring at approximately midportions thereof.

14. The assembly of claim 1, wherein a portion of said generally radially facing outer surface of said tone ring and a portion of said generally cylindrical inner surface of said tone ring receiving portion are shaped to form an interference fit.

15. The assembly of claim 1, wherein a portion of said generally radially outer surface of said tone ring and a portion of said generally cylindrical inner surface of said tone ring receiving portion are shaped to form a tight slip fit therebetween.

16. The assembly of claim 1, wherein said rotor is formed from a first material and said tone ring is formed from a second, different material.

17. A disc brake assembly comprising:
a rotor defining a rotational axis and including a barrel portion and a disc portion, said disc portion including at least one friction surface and extending generally radially outward from said barrel portion, wherein said barrel portion includes a generally circumferential inner surface and said generally circumferential inner surface defines a stop, a tone ring receiving portion and a groove having an axially outer wall, an axially inner wall and a radially outer bottom surface;

a tone ring defining a generally circumferential outer surface and including a tapered step extending generally radially outward from said generally circumferential outer surface and having a front face inclined relative to said rotational axis, said tone ring being positioned in said barrel portion;

a biasing element received in said groove such that said biasing element bears against said inclined front face and urges said tone ring against said tone ring receiving portion, said biasing element having a generally annular shape including a plurality of substantially linear segments and corners joining adjacent ones of said linear segments;

said biasing element being shaped to flex when seated within said groove so that said substantially linear segments are urged against and wedge between said axially outer wall and said inclined front face, and said corners urge against said radially outer bottom surface of said groove to urge said tone ring axially against said stop to prevent separation of said tone ring from said rotor during use.

* * * * *